United States Patent Office 3,476,860
Patented Nov. 4, 1969

3,476,860
HALOMETHYL FLUOROISOPROPYL ETHERS AS ANESTHETIC AGENTS
Louise S. Croix, Summit, and Alex J. Szur, North Plainfield, N.J., assignors to Air Reduction Company, Incorporated, New York, N.Y., a corporation of New York
No Drawing. Filed Dec. 8, 1966, Ser. No. 600,014
Int. Cl. A61k 13/00; C07c 43/12
U.S. Cl. 424—342                     4 Claims

ABSTRACT OF THE DISCLOSURE

This invention relates to certain novel halogenated derivatives of fluorinated isopropyl methyl ethers represented by the following formula:

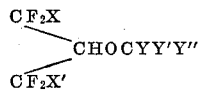

where X and X' can be Cl or F, Y is seletced from the group consisting of F and Cl and Y' and Y" are selected from the group consisting of H, Cl and F. The compounds can be prepared by chlorinating and fluorinating the corresponding haloisopropyl methyl ethers. The compounds are useful as solvents and dispersants for fluorinated materials and the compounds $CF_3(CF_2Cl)CHOCH_2Cl$ and $(CF_3)_2CHOCH_2Cl$ exhibit anesthetic properties in mammals.

DESCRIPTION OF THE INVENTION

This invention relates to certain novel halogenated derivatives of fluorinated isopropyl methyl ethers, more particularly to ethers represented by the following formula:

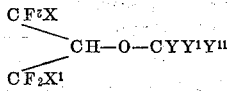

where X and X' may be chlorine or fluorine; and Y is selected from the group consisting of F and Cl and Y' and Y" are selected from the group consisting of hydrogen, chlorine and fluorine. Examples of these ethers are 1 - chloro - 1,1,3,3,3,-pentafluoroisopropyl chloromethyl ethyl $(CF_2Cl)(CF_3)CH$—O—$CH_2Cl$; 1,1,1,3,3,3, - hexafluoroisopropyl chloromethyl ether $(CF_3)_2CH$—O—$CH_2Cl$;

1,3 - dichloro - 1,1,3,3, - tetrafluoroisopropyl chloromethyl ether $(CF_2Cl)_2CHOCH_2Cl$; 1,1,1,3,3,3, - hexafluoroisopropyl difluoromethyl ether $(CF_3)_2CHOCHF_2$; and 1,1,1,3,3,3 - hexafluoroisopropyl chlorofluoromethyl ether $(CF_3)_2CHOCHFCl$.

These ethers may be prepared in various ways. A useful method of preparing the chloromethyl derivatives is by direct chlorination of the corresponding haloisopropyl methyl ethers as illustrated by the following reaction:

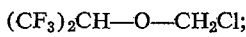

where X and X' are chlorine or fluorine, and $n$ is 1, 2 or 3. The chlorination is readily carried out by bubbling chlorine gas through the liquid reactant at a controlled rate substantially equivalent to the rate of reaction. The monochloro- and polychloromethyl ether derivatives will normally both result. However, the yields of the respective chloromethyl derivatives may be controlled within limits by the amount of chlorine added to the reaction. The reaction proceeds readily in the presence of incandescent light.

The flouoromethyl derivatives are advantageously obtained by fluorinating the chloromethyl ether products prepared as described above. The fluorination advantageously is carried out by reacting the chloromethyl derivatives with a molar equivalent amount of a fluorinating agent such as antimony trifluoride or hydrogen fluoride in the presence of a catalytic amount of pentavalent fluoride or chloride such as antimony pentafluoride or antimony pentachloride.

The starting fluorinated isopropyl ethers are a new class of compounds described and claimed in the copending application of Louise S. Croix, filed concurrently herewith. As disclosed therein, the fluoroisopropyl methyl ethers are advantageously derived from fluoroketones such as

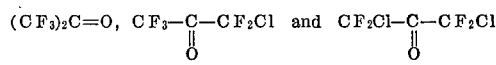

by reducing said ketones, such as by hydrogenation with $NaBH_4$, to give the corresponding alcohols which are then etherified by reaction with a methyl sulfate or halide in the presence of an alkali metal hydroxide.

The following examples illustrate the preparation of the new halomethyl ether derivatives:

EXAMPLE 1

Preparation of $CF_3(CF_2Cl)CHOCH_2Cl$ 85 g. (1.2 mole) of chlorine is slowly bubbled into a flask containing 208 g. (1.05 mole) of methyl 1-chloro-1,1,3,3,3, - pentafluoroisopropyl ether illuminated with a 250 watt incandescent lamp, starting at room temperature. The reaction proceeds exothermically with a moderate rise in temperature. The product is washed with a potassium carbonate solution until neutral, dried over $MgSO_4$ and vacuum distilled to yield 57 g. (0.23 mole) of chloromethyl 1-chloro-1,1,3,3,3, - pentafluoroisopropyl ether, B.P. 57° C./100 mm. (116° C./760 mm.), $n_D^{20}$ 1.35519. This represents a conversion of about 22%.

EXAMPLE 2

Preparation of $(CF_3)_2CHOCH_2Cl$ 164 g. (2.31 mole) of chlorine is slowly bubbled into a flask containing 370 g. (2.03 mole of methyl 1,1,1,3,3,3-hexafluoroisopropyl ether illuminated with a 250 watt incandescent lamp, starting at room temperature. The reaction proceeds exothermically with a moderate rise in temperature until absorption of chlorine ceases. The product is washed with a potassium carbonate solution until neutral, dried over $MgSO_4$ and vacuum distilled to yield 304 g. (1.5 mole) of chloromethyl 1,1,1,3,3,3, - hexafluoroisopropyl ether, B.P. 78° C/760 mm.; $n_D^{20}$ 1.31379. This represents a conversion of about 75%.

EXAMPLES 3 and 4

Preparation of $(CF_3)_2CHACHF_2$ and $(CF_3)_2CHOCHFCl$ 159 g. (0.63 mole) of $(CF_3)_2CHOCHCl_2$, 113 g. (0.63 mole) antimony trifluoride, and 5 drops of antimony pentachloride, approximately 0.05 wt. percent of the $SbF_3$, were added to a flask equipped with a stirrer, reflux condenser and thermometer. Upon heating the reaction commenced at 90° C. and the reaction mixture darkened, the temperature dropped to 63° C., and the mixture was refluxed for 1 hour. The products were distilled from the flask, washed with 50 ml. of 6 N HCl, and then with substantially the same quantity of a saturated potassium carbonate solution. The washed and neutralized crude product was dried over magnesium sulfate powder. Upon fractionation 5.5 g. of $(CF_3)_2CHO$—$CHF_2$ were obtained, B.P. 43° C./760 mm.; $n_D^{20}$ 1.26030. In addition, 31 g.

of $(CF_3)_2CHOCHFCl$ were obtained from such fractionation, B.P. 68.5° C./760 mm.; $n_D^{20}$ 1.30053.

The novel halomethyl fluoroisopropyl ethers of the present invention are water insoluble, inert, non-flammable liquids, easily miscible with other organic liquids including fats and oils, and have a faintly ethereal odor. They readily dissolve fluorocarbons and fluorowaxes and may be used to prepare pastes or dispersions useful for coatings and the like and may be used advantageously as degreasing agents. They are also useful as intermediates in the preparation of other halogenated compounds. For example, they may be dehydrohalogenated to give corresponding fluoroisopropenyl ethers by heating in a non-aqueous solvent medium, such as mineral oil, cellosolve or an excess of the ether reactant, in the presence of KOH as the dehydrohalogenating agent.

The products $CF_3(CF_2Cl)CHOCH_2Cl$ and $$(CF_3)_2CHOCH_2Cl$$

exhibit anesthetic properties in mammals and are each capable of inducing anesthesia in laboratory animals when administered by inhalation in vapor form. These agents are non-flammable and therefore lend themselves to effective use as inhalant anesthetics with oxygen or respirable mixtures containing life-supporting concentrations of oxygen by warrant of such freedom from the hazard of ignition which exists with other commonly used inhalant anesthetics.

$CF_3(CF_2Cl)CHOCH_2Cl$, for example, was administered to test mice by a standard procedure in which a measured quantity of the agent is placed in a laboratory jar and allowed completely to evaporate to give a calculated vapor concentration. The test mice are then quickly placed in the jar and observed. In such tests the agent induced anesthesia of the mice in 3.65 minutes at 0.625% vapor concentration. The induction time was reduced to 1.55 minutes at 1.25% concentration. At 0.938% concentration, induction occurred in 1.95 minutes. Recovery at the lower concentration occurred in 1.15 minutes and at the higher concentration in 8.00 minutes. Recovery at the intermediate concentration occurred in 5.20 minutes. Recovery times were measured from the time the administration of the anesthetic containing atmosphere was discontinued by removing the test mice from the test jar to room air. Light anesthesia was achieved at 0.625% and deep anesthesia was evidenced at 0.938%. There were no delayed deaths. Analgesia appeared to be present, and muscular relaxation was very good.

Similar tests were conducted with $(CF_3)_2CHOCH_2Cl$. With this agent, induction occurred at 1.57 minutes at 1.25% concentration. Recovery occurred in 1.10 minutes. At a concentration of 2.5% induction was 1.05 minutes and recovery 7.25 minutes. The agent exhibited excellent anesthetic syndrome with smooth induction and good relaxation and analgesia. There were no visible adverse effects and no delayed deaths.

What is claimed is:

1. A respirable anesthetic composition comprising 1-chloro-1,1,3,3,3 - pentafluoroisopropyl chloromethyl ether having the formula $$CF_3(CF_2Cl)CHO—CH_2Cl$$

in admixture with a sufficient amount of oxygen to support life and in suitable proportions for the production of anesthesia.

2. A respirable anesthetic composition comprising 1,1,1,3,3,3 - hexafluoroisopropyl chloromethyl ether having the formula $$(CF_3)_2CHOCH_2Cl$$

in admixture with a sufficient amount of oxygen to support life and in suitable proportions for the production of anesthesia.

3. The method of anesthetizing a mammal which comprises administering an effective amount of $$CF_3(CF_2Cl)CHOCH_2Cl$$

as a general inhalation anesthetic to said mammal.

4. The method of anesthetizing a mammal which comprises administering an effective amount of $$(CF_3)_2CHOCH_2Cl$$

as a general inhalation anesthetic to said mammal.

References Cited

UNITED STATES PATENTS

| | | |
|---|---|---|
| 2,992,276 | 7/1961 | Weinmayr. |
| 3,216,897 | 11/1965 | Krantz _____ 167—52.6 |
| 3,346,448 | 10/1967 | Gilbert et al. _____ 167—52.6 |

ALBERT T. MEYERS, Primary Examiner

JEROME D. GOLDBERG, Assistant Examiner

U.S. Cl. X.R.

260—614